United States Patent Office 3,207,789
Patented Sept. 21, 1965

3,207,789
CHEMICAL SEPARATION PROCESS FOR THE RECOVERY OF N-PHENYLCYCLOHEXYLAMINE
Charles W. Mathews, Trevor, Wis., assignor to Abbott Laboratories, North Chicago, Ill., a corporation of Illinois
No Drawing. Filed Jan. 17, 1963, Ser. No. 252,037
6 Claims. (Cl. 260—576)

The present invention is concerned with the isolation of N-phenylcyclohexylamine from admixtures with similar aromatic or cycloaliphatic amines. More particularly, it is concerned with the recovery of N-phenylcyclohexylamine from mixtures obtained by catalytically hydrogenating aniline to dicyclohexylamine and/or cyclohexylamine.

N-phenylcyclohexylamine has lately become a more important amine useful as an intermediate in various areas of syntheses. It is of particular value as such because the nitrogen atom carries as substituents an alicyclic and an aromatic nucleus and a reactive hydrogen atom. Obviously, the phenyl ring of N-phenylcyclohexylamine can be hydrogenated to produce dicyclohexylamine which has a number of useful applications as an intermediate or as a component in vapor-phase corrosion inhibitors, an antioxidant in motor oils, a rubber additive, etc.

N-phenylcyclohexylamine has always been obtained as a by-product in various chemical processes, particularly in the hydrogenation of aniline or mixtures of aniline and phenol, but a practical method of its isolation has heretofore not been known because these processes produce a number of similar amines. Practical methods have failed because fractionation cannot produce a satisfactory separation of the amines which boil in the same temperature range and influence each other's boiling points. The mutual influencing of boiling ranges with a mixture of aromatic and alicyclic amines is well known and thus the fractionation method can only be used to separate the low-boiling fraction from the high-boiling fraction. Using such a method, it is relatively simple to strip cyclohexylamine as well as a large percentage of aniline from such a mixture. The temperature necessary to distill off dicyclohexylamine, however, is relatively high and thus causes formation of side products and/or severe discoloration of the residual amines without providing a clear separation between the high-boiling dicyclohexylamine and N-phenylcyclohexylamine. In other words, if all the dicyclic amines and the low-boiling amines would be stripped from such a mixture as indicated above, a substantial portion of N-phenylcyclohexylamine would be entrained by the escaping vapors and the residual N-phenylcyclohexylamine would be strongly discolored and unsuitable for successful recovery. If the lower-boiling primary amines are first stripped and dicyclohexylamine is fractionated at a very high reflux ratio, considerable time-losses are encountered with the further disadvantage of producing low yields of residual N-phenylcyclohexylamine which is again discolored by accumulated by-products.

It is therefore the major object of the present invention to isolate substantially pure N-phenylcyclohexylamine from mixtures containing other aromatic or alicyclic amines. It is another object of this invention to provide a simple, fast and economical method to drastically reduce or to strip the aromatic or alicyclic primary amines and/or the amount of dialicyclic amines from a mixture containing N-phenylcyclohexylamine.

These and other objects are accomplished by acidifying an aqueous mixture containing N-phenylcyclohexylamine among other aromatic or alicyclic amines to a pH of above 2.7 with acetic acid, sulfuric acid or phosphoric acid, and recovering the N-phenylcyclohexylamine from the organic phase of the formed two-phase system by simple fractionation.

The above term "aqueous mixture" is used in the present specification to refer to a mixture of water with a water-immiscible or with a water-miscible liquid. Thus, the term is used in connection with a single-phase or a two-phase system. Each of the phases involved may be a solution, i.e., an inert component may be dissolved therein. The acidifying step referred to above is meant to express that a pH below 7.0 is to be obtained in the resulting two-phase system, with the lower limitation of pH as indicated above. Thus, the useful pH-range for the process of the present invention is limited to between 2.7 and <7.0.

The method of the present invention is applicable whenever a mixture of aromatic and alicyclic amines is present from which the N-phenylcyclohexylamine component is to be separated. The amounts of the various components in said mixture of amines is immaterial: the present process is usefully employed where N-phenylcyclohexylamine is present in a range from 5% to 95% of the total amount of amines. The amount of water necessary for the formation of a two-phase system is also variable and depends upon the relative amount of N-phenylcyclohexylamine. Usually, about 0.1 part of the total volume is the practical lower limit for water and no advantage is seen in increasing the total volume of the two-phase system beyond about ten volumes of water per volume of organic phase. As a rule, with less N-phenylcyclohexylamine, a larger amount of water is used and with more N-phenylcyclohexylamine, less water is needed to keep the formed dicyclohexylamine salt in solution. It is, however, important that the organic phase contain some portion of water prior to the addition of the acid, since without the initial presence of water some of the amines may form salts insoluble in either phase. The total amount of water to form an easily separable two-phase system can easily be regulated by first adding or increasing the amount of water to the desired amount, followed by the addition of a somewhat concentrated acid, or by adding first only a small amount of water followed by the addition of a more dilute acid.

In a general embodiment of the present invention, a mixture, containing N-phenylcyclohexylamine, dicyclohexylamine, cyclohexylamine, cyclohexylidinecyclohexylamine, and aniline, is placed in a separatory funnel, together with about an equal volume of water. Sulfuric acid is added to this two-phase system under agitation until the pH is adjusted to about 4. The two layers are then allowed to separate and the aqueous phase is withdrawn. From this aqueous phase containing a mixture of sulfate salts, primary amines such as cyclohexylamine and aniline as well as dicyclohexylamine can be recovered by neutralization, phase separation, and distillation. The remaining organic phase is substantially free of dicyclohexylamine, and pure N-phenylcyclohexylamine can be recovered therefrom by distillation or fractionation. Such an operation is now facilitated by the fact that virtually all of the dicyclohexylamine is withdrawn from the amine mixture and stripping the lower-boiling residual amines therefrom produces N-phenylcyclohexylamine in almost pure form. If the initial mixture of amines contains an extremely large amount of dicyclohexylamine and a very small amount of N-phenylcyclohexylamine, it may be advantageous to repeat the simple steps of adding water to the separated organic phase, acidifying it, and reseparating the organic phase.

The present invention is better understood by reference to the following examples which are given here as illustrations only and are not meant to limit the invention in any respect. In all these examples a mixture of aromatic, alicyclic, dialicyclic and alicyclic/aromatic amines is used as the starting material for the recovery of N-phenylcyclohexylamine. Such a mixture, for instance, is encountered by using the following known process: aniline is hydrogenated to completion in the presence of a hydrogenation catalyst. From the resulting liquid, cyclohexylamine is recovered by distillation, leaving a residue of similar amines which always form as by-products. A typical accumulation of such residues, hereinafter referred to as "blend," has the following composition:

|   | Percent |
|---|---|
| N-phenylcyclohexylamine | 46.5 |
| Dicyclohexylamine | 22.4 |
| Cyclohexylidinecylohexylamine | 1.3 |
| Cyclohexylamine | 8.5 |
| Cyclohexanol | 8.8 |
| Aniline | 10.5 |

EXAMPLE 1

To a mixture of 97.2 grams of a "blend" of the above composition is added 200 ml. of water. The mixture is stirred while concentrated sulfuric acid is added until a pH of 3.6 is obtained. The mixture is then transferred into a separatory funnel and the aqueous phase is separated therefrom. The organic phase, consisting of 49.46 grams of material, is worked up by a short-pass azeotropic distillation, yielding 29.78 grams of 99.0% pure N-phenylcyclohexylamine containing 0.3% aniline and 0.1% cyclohexylamine. The boiling point of the N-phenylcyclohexylamine at 6 mm. pressure is 127° C.

The aqueous phase is used to recover cyclohexylamine and dicyclohexylamine by fractionation.

EXAMPLE 2

Samples of 10 ml. each of the above "blend" are mixed with 20 ml. of water and concentrated sulfuric acid to a pH of (a) 4.5, (b) 5.5, and (c) 5.1, respectively.

Each of these samples is shaken for a short period of time in a separatory funnel. The aqueous phases are then withdrawn from each sample and the organic phases are analyzed by gas chromatography. The results obtained from the above mixtures indicate the recovery of 89% in (a), 98% in (b), and 102% in (c), respectively, of the amount of N-phenylcyclohexylamine originally present. In all samples, the amount of dicyclohexylamine is below 1.1% of the total organic phase.

EXAMPLE 3

In the above manner, a "blend" with the composition shown above is separated into two phases at the following pH levels obtained by the addition of sulfuric acid: (a) at a pH of 8.1, (b) at a pH of 9.1, (c) at a pH of 7.0, and (d) at a pH of 5.5. The following percentages of components are found by chromatographic analysis of the organic layer:

*Table 1*

| Component | (a) | (b) | (c) | (d) |
|---|---|---|---|---|
| Cyclohexylamine | 1.0 | 1.4 | 0.2 | 0.2 |
| Cyclohexanol | 8.4 | 8.3 | 9.3 | 9.1 |
| Aniline | 9.9 | 9.8 | 11.3 | 11.7 |
| Dicyclohexylamine | 19.9 | 24.0 | 6.2 | 0.8 |
| Cyclohexyliminocyclohexane |  | 0.1 |  |  |
| Cyclohexyliminobenzene |  |  |  | 0.6 |
| N-phenylcyclohexylamine | 59.8 | 55.0 | 72.1 | 74.5 |

This example demonstrates the effected enrichment of N-phenylcyclohexylamine in the mixture at a pH of 7 and below 7 and the high percentage of dicyclohexylamine obtained therewith at a pH of 7 and above 7. It thus follows that for substantially complete removal of dicyclohexylamine, a pH of below 7 must be used.

EXAMPLE 4

The above described "blend" is mixed with two volumes of water and from this mixture, aliquots of 30 ml. each are taken for the following experiments:

(a) The pH is adjusted to 4.5 with acetic acid. The result of the gas chromatographic analysis of the organic phase is shown below under (a).

(b) The pH is adjusted to 4.5 with phosphoric acid. The result of the gas chromatographic analysis of the organic phase is shown under (b) below.

(c) The mixture is acidified with hydrochloric acid to a pH of 5.0 whereupon solids form. The solids are filtered off and the filtrate is made alkaline by the addition of sodium hydroxide to a pH of 11.6. The organic layer of only 2 ml. is separated and analyzed by gas chromatography, giving the results shown under (c) below.

*Table 2*

| Component | (a) | (b) | (c) |
|---|---|---|---|
| Cyclohexylamine | 0.46 |  | 17.40 |
| Cyclohexanol | 8.70 | 10.75 | 10.80 |
| Aniline | 6.90 | 7.34 | 20.00 |
| Dicyclohexylamine | 1.60 | 0.12 | 10.80 |
| Cyclohexyliminocyclohexane |  |  | 1.10 |
| Cyclohexyliminobenzene | 0.22 | 0.40 | 0.19 |
| N-phenylcyclohexylamine | 79.70 | 78.50 | 37.20 |

This example shows that while phosphoric acid and acetic acid produce substantially identical results as those obtained with sulfuric acid, hydrochloric acid cannot be used for the separation due to the formation of solids and the complications thereby encountered.

EXAMPLE 5

This example is carried out in analogy to Example 1 using sulfuric acid to adjust the pH to 5.70, 5.98, 6.21, 6.37, 6.55, 6.78 and 7.1, respectively. The analytical results obtained by gas chromatography of the separated organic layers of the first six test samples show an enrichment of this phase to 75.2–77.6% of N-phenylcyclohexylamine in all these instances, while the dicyclohexylamine fraction increases between the lower (5.7) and higher pH (6.78) from 0.4% to 1.2% of the organic phase. In the last of the above tests (pH=7.1), the N-phenylcyclohexylamine is also enriched to about 72% but the amount of the high-boiling dicyclohexylamine remaining admixed therewith attains an intolerable level of over 6%.

EXAMPLE 6

To 20 ml. of the amine mixture containing

|   | Percent |
|---|---|
| Dicyclohexylamine | 75.5 |
| Cyclohexylamine | 2.3 |
| Aniline | 10.6 |
| N-phenylcyclohexylamine | 7.7 |
| Cyclohexanol | 1.0 |
| Schiff bases | 3.0 |

150 ml. of water is added and the pH is adjusted with concentrated sulfuric acid to 3.7. After separating the aqueous layer, the organic layer remaining amounts to <2 ml. This phase is analyzed by gas chromatography showing 91.5% N-phenylcyclohexylamine and 0.6% dicyclohexylamine, the remainder being low-boiling impurities.

This example shows that even if only a very small percentage of the total liquid in the separatory funnel is N-phenylcyclohexylamine, excellent separation is possible.

EXAMPLE 7

A blend containing more than 90% of N-phenylcyclohexylamine is treated in the manner shown in Example 6 with water and sulfuric acid at a pH of 4.12. Again, excellent separation is possible, resulting in recovery of almost the quantitative amount of N-phenylcyclohexylamine initially present.

From the above examples it is seen that excellent separation of N-phenylcyclohexylamine from amine blends containing the former is achieved at a pH between 2.7 and just below 7.0 by the addition of sulfuric acid, acetic acid, or phosphoric acid. These are the most economical commercial acids with which such a separation is possible, since hydrochloric acid or nitric acid will not separate the layers in a simple operation. As mentioned above, the important point in separating the N-phenylcyclohexylamine is the elimination or substantial elimination of dicyclohexylamine from such a blend of amines because only dicyclohexylamine interferes with the fractionation of N-phenylcyclohexylamine. If any lower-boiling amines are not completely removed from the organic phase produced by the above separation method, they will be eliminated by a short-pass azeotropic distillation of these components boiling substantially lower than N-phenylcyclohexylamine. It is thus important that the amount of dicyclohexylamine in the organic phase is reduced to a very small percentage, and this is easily achieved by the methods described herein.

The above described invention produces the surprising result of separating N-phenylcyclohexylamine regardless of the composition of the initial blend containing the latter. Whether the starting mixture contains 5% or even less or as much as 95% N-phenylcyclohexylamine, clear separation of this component is achieved by the simple process of adding sulfuric, phosphoric or acetic acid to an aqueous mixture of these amines.

Others may practice the invention in any of the numerous ways which will be suggested to one skilled in the art by the present disclosure. All such practice of the invention is considered to be a part hereof provided it falls within the scope of the appended claims.

I claim:

1. The process of isolating N-phenylcyclohexylamine from a blend of cyclic amines obtained by catalytically hydrogenating aniline, comprising the steps of
   adjusting the pH of an aqueous mixture of said blend to between 2.7 and below 7.0 by adding an acid selected from the group consisting of sulfuric acid, phosphoric acid and acetic acid, separating the organic phase, and fractionating said organic phase.

2. The process of claim 1 wherein the pH is adjusted to said range by the addition of sulfuric acid.

3. The process of claim 1 wherein the pH is adjusted to said range by the addition of acetic acid.

4. The process of claim 1 wherein the pH is adjusted to said range by the addition of phosphoric acid.

5. The process of obtaining an organic liquid consisting substantially of N-phenylcyclohexylamine, comprising the steps of
   treating a blend of cyclic amines obtained by catalytically hydrogenating aniline containing between 5% and 95% of N-phenylcyclohexylamine (a) with 0.1–10 volumes of water and (b) with a member selected from the group consisting of sulfuric acid, phosphoric acid and acetic acid, to attain a pH between 2.7 and 7.0, and removing from the obtained two-phase system the aqueous phase.

6. The process of claim 5 wherein said acid is sulfuric acid.

References Cited by the Examiner

Fouque: Comptes Rendus, 1917, Tome 165, pp. 1062–1065.

CHARLES B. PARKER, *Primary Examiner.*